(12) United States Patent
Farrell et al.

(10) Patent No.: US 11,681,734 B2
(45) Date of Patent: Jun. 20, 2023

(54) ORGANIZING FRAGMENTS OF MEANINGFUL TEXT

(71) Applicant: International Business Machines Corporation, Armonk, NY (US)

(72) Inventors: Robert G. Farrell, Cornwall, NY (US); Mustafa Canim, San Jose, CA (US); Douglas Ronald Burdick, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 238 days.

(21) Appl. No.: 17/115,834

(22) Filed: Dec. 9, 2020

(65) Prior Publication Data
US 2022/0179896 A1    Jun. 9, 2022

(51) Int. Cl.
| | | |
|---|---|---|
| *G06F 16/00* | (2019.01) | |
| *G06F 16/35* | (2019.01) | |
| *G06F 40/131* | (2020.01) | |
| *G06F 40/30* | (2020.01) | |

(52) U.S. Cl.
CPC .......... *G06F 16/355* (2019.01); *G06F 40/131* (2020.01); *G06F 40/30* (2020.01)

(58) Field of Classification Search
CPC ...... G06F 16/355; G06F 40/30; G06F 40/131; G06F 40/177; G06F 40/183
See application file for complete search history.

(56) References Cited

U.S. PATENT DOCUMENTS

| | | | |
|---|---|---|---|
| 6,163,775 A | 12/2000 | Wlaschin | |
| 7,590,647 B2 | 9/2009 | Srinivasan | |
| 7,603,351 B2 * | 10/2009 | Mansfield | G06F 16/36 707/999.005 |
| 8,443,278 B2 * | 5/2013 | Mansfield | G06F 40/40 715/227 |
| 8,719,308 B2 | 5/2014 | Xiong | |
| 9,245,010 B1 | 1/2016 | Donneau-Golencer | |
| 9,946,798 B2 * | 4/2018 | Bhatia | G06F 16/9535 |
| 10,733,434 B2 * | 8/2020 | Cramer | G06V 30/416 |
| 11,176,364 B2 * | 11/2021 | Meier | G06V 30/416 |
| 11,200,413 B2 * | 12/2021 | Burdick | G06V 30/416 |
| 2007/0250497 A1 * | 10/2007 | Mansfield | G06F 16/36 707/999.005 |
| 2011/0249905 A1 | 10/2011 | Singh | |

(Continued)

OTHER PUBLICATIONS

Angelino, Elaine, "Extracting structure from human-readable semistructured text", printed on Aug. 4, 2020, Retreived from https://people.eecs.berkeley.edu/~elaine/pubs/angelino-structure.pdf, 22 pages.

(Continued)

*Primary Examiner* — Leslie Wong
(74) *Attorney, Agent, or Firm* — Stephen R. Yoder

(57) ABSTRACT

Organizing and/or aligning fragments of text that are included in a set of physical and/or digital documents so that the arrangement of the text fragments is in a readily understandable and meaningful format for a given reader. This organization and/or alignment uses a relation model of the various text fragments to correlate a meaning between and amongst the various text fragments to ultimately determine the final alignment and/or arrangement of those text fragments.

18 Claims, 3 Drawing Sheets

(56) References Cited

U.S. PATENT DOCUMENTS

| | | | | |
|---|---|---|---|---|
| 2013/0013612 | A1* | 1/2013 | Fittges | G06F 16/353 707/739 |
| 2015/0093021 | A1* | 4/2015 | Xu | G06V 30/412 382/159 |
| 2016/0191295 | A1* | 6/2016 | Dong | G06F 16/95 707/741 |
| 2017/0243028 | A1* | 8/2017 | LaFever | G06F 21/6254 |
| 2018/0060305 | A1* | 3/2018 | Deleris | G06F 7/02 |
| 2019/0050639 | A1* | 2/2019 | Ast | G06V 10/82 |
| 2019/0325211 | A1* | 10/2019 | Ordonez | G06V 30/414 |
| 2020/0042785 | A1* | 2/2020 | Burdick | G06V 30/416 |
| 2020/0073882 | A1* | 3/2020 | Guggilla | G06F 16/353 |
| 2021/0406266 | A1* | 12/2021 | Chan | G06N 3/0445 |
| 2021/0406771 | A1* | 12/2021 | Basak | G06N 3/0454 |
| 2022/0114346 | A1* | 4/2022 | Galitsky | G06F 40/35 |

OTHER PUBLICATIONS

Chen et al., "Word Relation Autoencoder for Unseen Hypernym Extraction Using Word Embeddings", Proceedings of the 2018 Conference on Empirical Methods in Natural Language Processing, pp. 4834-4839, Brussels, Belgium, Oct. 31-Nov. 4, 2018, © 2018 Association for Computational Linguistics, 6 pages.

Hammar et al., "Deep Text Mining of Instagram Data Without Strong Supervision", arXiv:1909.10812v1 [cs.CL], Sep. 24, 2019, 8 pages.

Hansen et al., "Data-Driven Recognition and Extraction of PDF Document Elements", technologies, MDPI, Published: Sep. 11, 2019, Technologies 2019, 7, 65; doi:10.3390/technologies7030065, 19 pages.

Holecek et al., "Table understanding in structured documents", arXiv:1904.12577v2 [cs.IR] Jul. 9, 2019, 7 pages.

Schreiber et al., "DeepdeSRT: Deep Learning for Detection and Structure Recognition of Tables in Document Images", In 2017 14th IAPR International Conference on Document Analysis and Recognition (ICDAR) (vol. 1, pp. 1162-1167). IEEE, 6 pages.

Siddiqi et al., "Keyword and Keyphrase Extraction Techniques: A Literature Review", International Journal of Computer Applications (0975-8887) vol. 109—No. 2, Jan. 2015, 6 pages.

Yeh et al., "An Annotated Corpus and Method for Analysis of Ad-Hoc Structures Embedded in Text", In Proceedings of the Tenth International Conference on Language Resources and Evaluation (May 2016), (LREC'16) (pp. 2063-2070), 8 pages.

* cited by examiner

ORGANIZING FRAGMENTS OF MEANINGFUL TEXT

BACKGROUND

The present invention relates generally to the field of tabular data formats, and more particularly to organizing certain aspects of the tabular data so that the tabular data is formatted in a manner that can be readily interpreted and understood by a given user of that data.

The term "text string" and/or "text fragment" is used in this document. To disambiguate the meaning of these terms, the definition provided in the following paragraph will be used.

The Wikipedia entry for "String (computer science)" (as of Oct. 8, 2020) states as follows: "[A] string is traditionally a sequence of characters, either as a literal constant or as some kind of variable. The latter may allow its elements to be mutated and the length changed, or it may be fixed (after creation). A string is generally considered as a data type and is often implemented as an array data structure of bytes (or words) that stores a sequence of elements, typically characters, using some character encoding. String may also denote more general arrays or other sequence (or list) data types and structures."

SUMMARY

According to an aspect of the present invention, there is a method, computer program product and/or system that performs the following operations (not necessarily in the following order): (i) receive, from a corpus of text documents, a plurality of text fragments, with the plurality of text fragments being text strings that are organized in a staggered manner; (ii) identify, from the plurality of text fragments, a first arrangement of the plurality of text fragments; (iii) responsive to the identification of the first arrangement, extracting a first set of text fragments to obtain an extracted set of text fragments; (iv) generating a relation model based upon the extracted set of text fragments, with the relation model including information indicative of a semantic relatedness value defining the extracted set of text fragments; (v) clustering the extracted set text fragments into a first group, based, at least in part, upon the relation model; (vi) combining the clustered set of text fragments from the first group into composite text objects; and (vii) optimizing an alignment of the composite text objects to obtain an organized text fragment.

DETAILED DESCRIPTION

Figure 1:
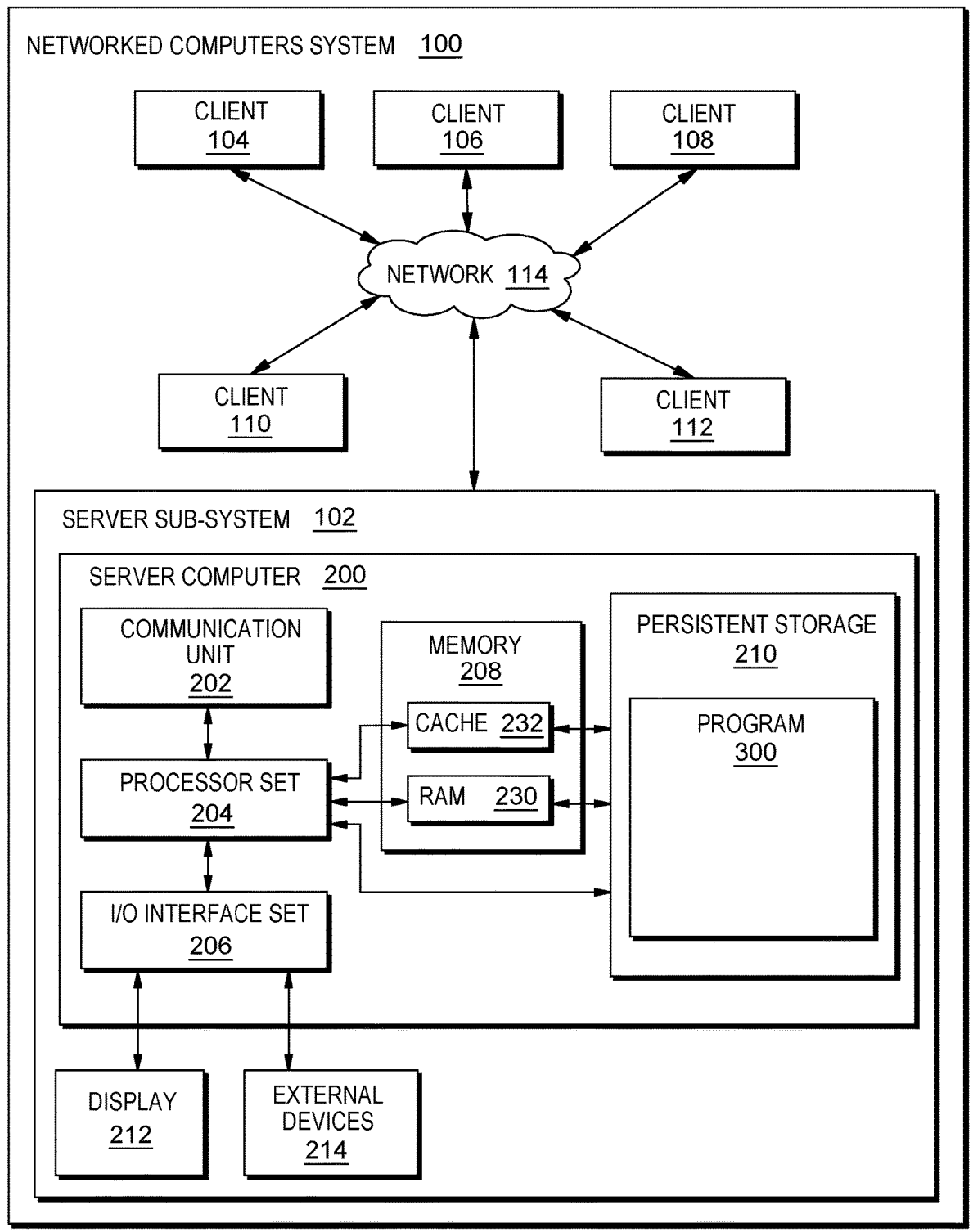
FIG. 1 is a block diagram view of a first embodiment of a system according to the present invention.

Some embodiments of the present invention are directed to organizing and/or aligning fragments of text that are included in a set of physical and/or digital documents so that the arrangement of the text fragments is in a readily understandable and meaningful format for a given reader. This organization and/or alignment uses a relation model of the various text fragments to correlate a meaning between and amongst the various text fragments to ultimately determine the final alignment and/or arrangement of those text fragments.

This Detailed Description section is divided into the following sub-sections: (i) The Hardware and Software Environment; (ii) Example Embodiment; (iii) Further Comments and/or Embodiments; and (iv) Definitions.

I. THE HARDWARE AND SOFTWARE ENVIRONMENT

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: server sub-system 102; client sub-systems 104, 106, 108, 110, 112; communication network 114; server computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. EXAMPLE EMBODIMENT

Figure 2:
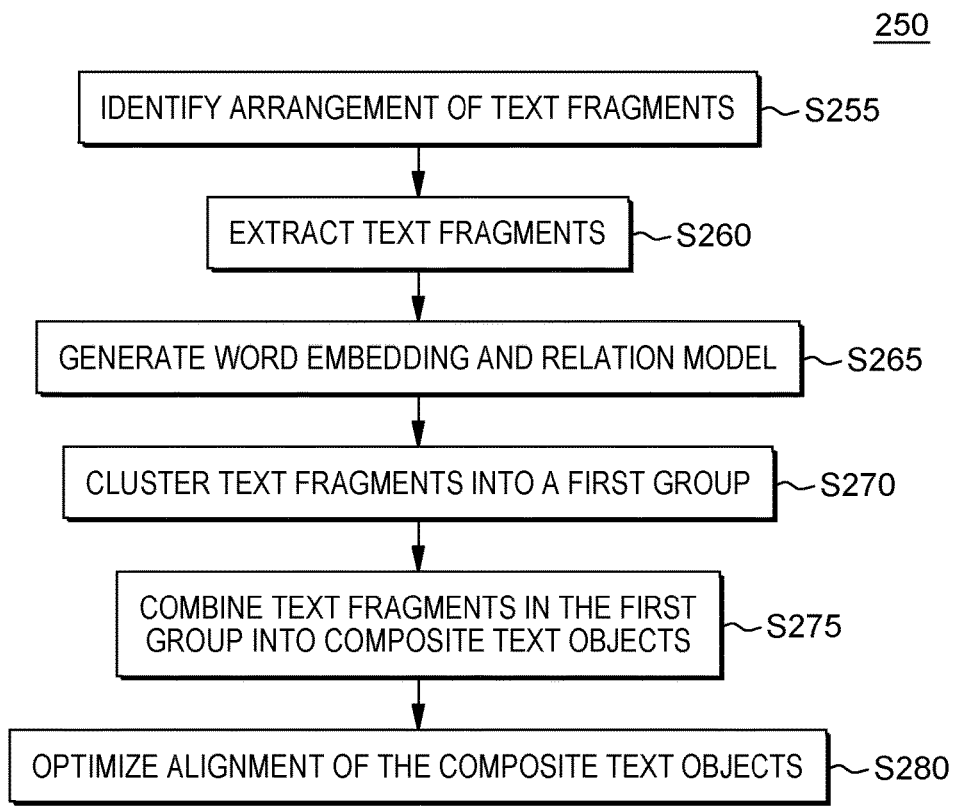
FIG. 2 is a flowchart showing a first embodiment method performed, at least in part, by the first embodiment system.
Figure 3:
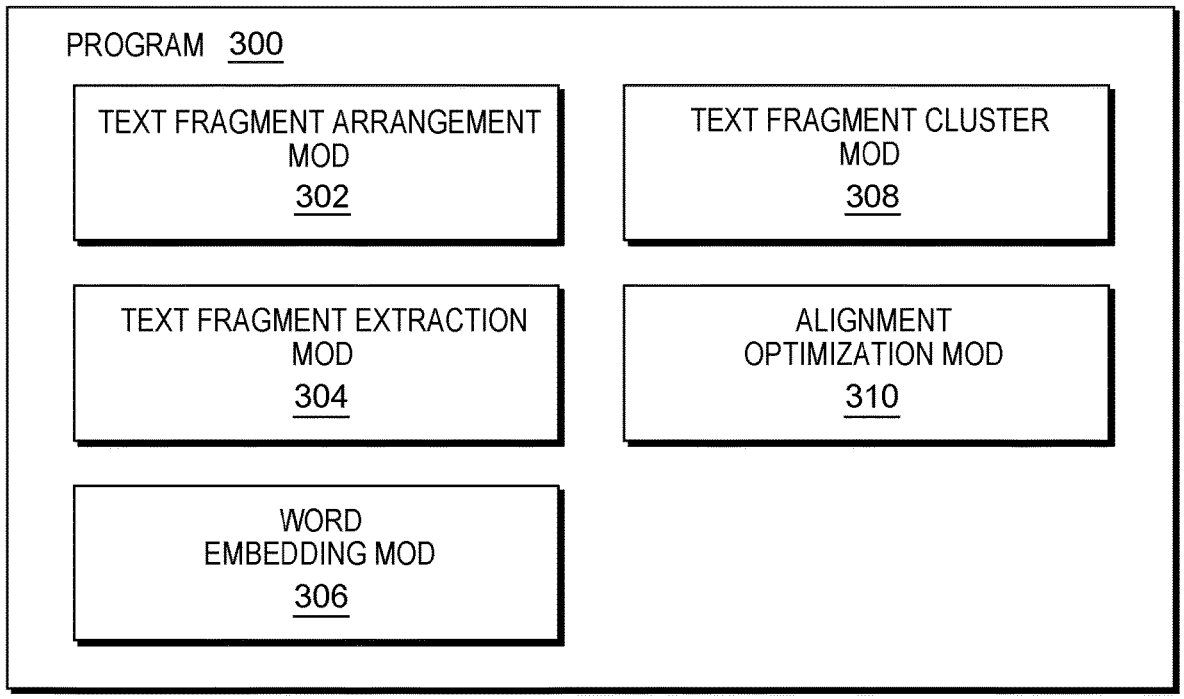
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where text fragment arrangement module ("mod") 302 identifies a first arrangement of text fragments (that is, text fragment arrangement mod identifies a first set of text fragments that are not necessarily aligned in a manner that would allow a reader of those text fragments to readily know which portions of text belong to which fragmented group).

Processing proceeds to operation S260, where text fragment extraction mod 304 extracts the identified text fragments from text tokens (that is, from operation S255, above).

Processing proceeds to operation S265, where word embedding mod 306 generates a word embedding and relation model. In some embodiments of the present invention, word embedding mod 306 generates at least the following through machine learning methods: (i). a text content index from a corpus of text that is the subject of the current method; (ii) a word embedding model; and (iii) a word-relation model. In some embodiments, a relation model is used to identify potential relationships between words and entities. For instance a relation model would return a higher probability for the relationship "is-father" in "Person A is- . . . . . . . . of Person B" as opposed to the relationship of is-son, with Person A representing a known father and with Person B representing a known son. The relation models can additionally help identifying the relationships between fragments of text pieces.

Processing proceeds to operation S270, where text fragment cluster mod 308 clusters: (i) text fragments that are proximal to one another, and (ii) text fragments that are similar to one another. In some embodiments, the text fragments that are clustered together will have a similarity in meaning (or usage in a given context—that is, the clustered text fragments in this case are synonyms).

Processing proceeds to operation S275, where text fragment cluster mod 308 combines the clustered text fragments (from operation S270, above) into a first group of composite text objects.

Processing proceeds to operation S280, where alignment mod 310 optimizes the alignment of the composite text objects (from operation S275, above). In some embodiments of the present invention, alignment mod 310 optimizes the alignment of these composite text objects using the semantic relatedness of adjacent composite text objects from the text-relation model. In other words, the semantic relatedness of the composite text objects is derived from the clustered text fragments that include synonyms.

III. FURTHER COMMENTS AND/OR EMBODIMENTS

Some embodiments of the present invention recognize the following facts, potential problems and/or potential areas for improvement with respect to the current state of the art: (i) table data extraction systems work best on uniform structured tables in documents by utilizing text position, geometric lines, delimiters, styling, or other tabular alignment indicators; (ii) some documents, such as those from documents that are scanned PDF documents, have tables with the meaningful text broken into fragments with no fixed layout and insufficient tabular alignment indicators; and/or (iii) examples of these types of documents include scanned legal disclosures, invoices, medical statements, and financial reports.

Some embodiments of the present invention include a method providing a mechanism to organize fragments of text in a document into a tabular format using the meaning of the fragments. Currently, systems that tackle this problem generally take one of two approaches: (i) a "format-driven" approach, or (ii) a "database-driven" approach. With respect to the first approach, "format-driven" systems use rules, patterns and/or a trained model to extract a table using spatial and formatting features such as text position, geometric lines, delimiters, and styling. Additionally, "format-driven" systems then use downstream natural language processing within the cells to generate a semantic interpretation.

With respect to the second approach, "database-driven" systems identify table cells using database entries. For example, some proprietary systems can extract rows of tables in invoices if the cell content is already known in a database. By contrast, embodiments of the present invention seek to use the meaning of the text fragments themselves in order to assemble and organize those text fragments into a table.

Some embodiments of the present invention may include one, or more, of the following features, characteristics and/or advantages: (i) improves table alignment using semantic information about fragments of text; (ii) uses this type of semantic information to optimize the alignment of text within a given table; and (iii) provides a potentially simpler and compressed table by optimizing the alignment of text within the given table.

Typically, most table processing systems first extract tables by using lines, headers, whitespace, and the like. After this extraction, most table processing systems typically process the recognized extracted portions of text as text objects that are then fed to natural language processing (NLP) modules. In some embodiments, the semantics of the text is not used initially when trying to organize and piece together fragments of text.

In some embodiments, the semantics for the fragments of text may not necessarily come from known information sources (such as Wikipedia) or known knowledge graph sources (such as Wikidata). In some embodiments, the meaning of the fragments of text comes from the specific corpus of documents where the tables are found. This allows some embodiments to utilize embeddings that are generated from the text corpus that contain the fragments of text.

Additionally, some embodiments of the present invention recognize that alignments of fragments will be ambiguous. This ambiguity is typically resolved when fragments are combined into composite text objects that are found in a text content index or when the composite text objects are related to other text objects in a potential alignment.

Some embodiments of the present invention include a method for optimizing the spatial alignment of various fragments of text in a table. This method includes the following operations (not necessarily in the following order): (i) identifying an arrangement of text fragments and blank space in a document in a corpus of documents; (ii) extracting from the text fragments text tokens; (iii) generating from the corpus a text content index, word embedding and relation model by machine learning; (iv) generating from the word embedding fragment vectors for text fragments; (v) clustering the proximal and similar text fragments into initial; (vi) combining the initial groups into composite text objects represented in the text content index; (vii) optimizing the alignment of the composite text objects using the semantic relatedness of adjacent composite text objects in the relation model; and (viii) simplifying the table by eliminating empty rows and columns. Additionally, the operation of clustering the proximal and similar text fragments into initial groups includes evaluating by a cosine similarity method.

Some embodiments of the present invention may include one, or more, of the following features, characteristics and/or advantages: (i) uses text embeddings and/or semantic similarity matching techniques to solve text alignment issues in tables; (ii) solves the ambiguities in text alignment issues of table extraction; (iii) finds associations between cell values within a structured set of information; (iv) leverages embeddings to distinguish cell values for the text fragment alignment problem; (v) uses text embeddings for disambiguating cells for the text fragment alignment problem; (vi) utilizes semantic similarities in word tokens amongst the various cells in a given table to determine a potential meaning of the word tokens; and (vii) uses a text similarity identification by text embeddings trained from a corpus of documents containing text.

In some embodiments of the present invention, the semantic similarity of the text fragments is determined from the cosine similarity of text fragments in a word embedding. A cosine similarity is a metric used to measure how close two vectors are with respect to each other in a vector space model. This is calculated by getting the cosine of the angle between these two vectors. If the angle is zero (0), then the cosine of that would be one (1), indicating maximum affinity between the vectors. If it is a ninety (90) degree angle, then the cosine distance would be zero (0). If two embeddings are given, the cosine distance between them would indicate how relevant these two text pieces are. In some embodiments of the present invention, the semantic relatedness of composite text objects is determined from: (i) the similarity of composite text objects using a relation model (that includes text embeddings and an autoencoder), where the vector for the composite text object is a function (such as an average) of the contained fragments, or (ii) direct or inferred relationship from a semantic web graph.

There are several use cases for implementing certain embodiments of the present invention. These include, but are not necessarily limited to, the following: (i) document table processing (searching for tables across a corpus of "noisy" documents (that is, highly unorganized documents that contain several unaligned fragments of text)); (ii) table understanding (extracting information and semantic relationships from tables containing fragments); (iii) data fusion (extracting, linking, and processing fragmented text across multiple tables); (iv) messaging (organizing multiple messages containing fragments into a table, which sometimes includes threaded messages); (v) word processors/editors (organizing fragmented text in documents into concise, clean tables); and (vi) decision support systems.

This last use case (decision support system) is useful for when certain queries return data that is difficult to interpret from documents that contain many discrete pieces of fragmented text. These discrete pieces of fragmented text can then be organized into tables for a presentation in a concise form that allows a set of users to make decisions based on the newly-organized tables.

With respect to the current state of the art, methods of organizing text would include some of the following elements: (i) text tokens; (ii) text fragments; (iii) text groupings; and (iv) composite text. In one example, an organized table from unorganized text fragments is shown below in Table A.

TABLE A

Organized Text Fragments from Previously Unorganized Text Fragments (With Respect To The Current State Of The Art)

| Person A | Mayor |
|---|---|
| Person B | Hedge Fund |

In the above example, the text tokens include: Person, A, Mayor, Person, B, Hedge, and Fund. Text Fragments include: Person A, Person B, Mayor, Hedge, and Fund. An initial grouping of the unorganized text fragments includes: Mayor and Hedge, Hedge and Fund, Person, A, and Person B. Finally, a composite text formed from these groupings includes: Mayor Hedge, Hedge Fund, Person, A, and Person B. In some embodiments, relative scores indicating the semantic similarity between the composite text are given to determine whether the generated composite text is sufficiently accurate. In this example: (i) "Mayor Hedge" would receive a relatively low score, indicating an unlikely semantic similarity between the text tokens; and (ii) "Hedge Fund" would receive a relatively high score, indicating a high semantic similarity between the text tokens.

With respect to the current state of the art, there are at least five stages of organizing these text fragments, with each stage including a corresponding set of processes. These stages include: (i) PDF Parsing/Optical Character Recognition (OCR); (ii) Pre-Processing; (iii) ML-Table Script; (iv) Post-Processing; and (v) HTML Generation.

The PDF Parsing/OCR stage includes applying OCR to scanned images, identifying text tokens, bounding boxes, adjusting font features, and identifying graphical lines and color rectangles. The Pre-Processing Stage includes removing invisible text and ruling lines, merging overlapping rectangles, merging text tokens into phrases (in a horizontal orientation) using positioning methods, merging phrases into paragraphs (in a vertical orientation) using positioning methods, and generating a feature matrix.

The ML-Table Script stage includes: (i) canvas discretization and alignment; (ii) ruling-line grids; (iii) white-space lines and grids; (iv) table regions; (v) table cell structure; (vi) table scoring and region adjustment; and (vii) best non-overlapping tables selection. The Post-Processing stage includes semantic elements (such as sections, lists and footnotes) and operations for merging multi-page tables and headers. Finally, the HTML Generation stage includes encoding boxes in <bbox> tags and encoding in-column tabbing and in-cell formatting. The operations described here are improved upon by certain embodiments of the present invention, as described below in connection with block diagram 400.

Figure 4:
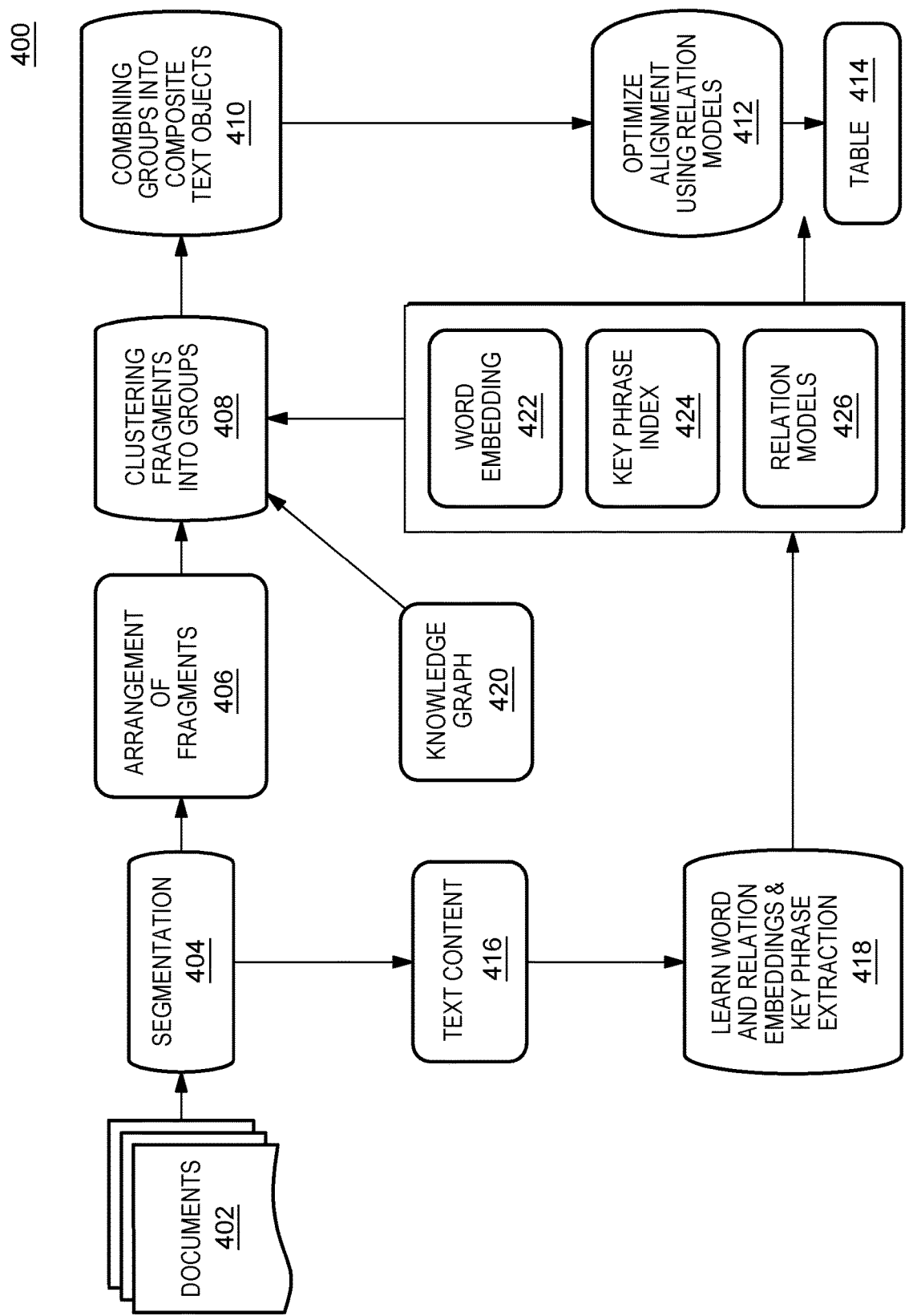
FIG. 4 is a block diagram of an embodiment of a system according to the present invention.

FIG. 4 shows block diagram 400 of a system designed to optimize the alignment of various fragments of text according to some embodiments of the present invention. It is important to note that block diagram 400 includes software modules designed to perform specified operations relating to organizing text fragments, the operations relating to organizing text fragments, and other related objects (such as corpus of documents 402). For ease of the reader, only software modules will be labeled as "modules" and operations that are performed by those modules will be labeled as "operations," and all other remaining objects will remain unlabeled for the purposes of this paragraph.

Block diagram 400 includes: corpus of documents 402, segmentation module 404, arranging text fragments 406, clustering fragments into groups 408, combining groups into composite text objects 410, optimizing alignment of text fragments using a relation model 412, table 414, text content 416, learning word and relation embedding/key phrase extraction operation 418, word embedding operation 422, key phrase index 424, and relation models 426.

Diagram 400 shows a manner in which additional similar text can be retrieved from text context around tables (such as table 414). Diagram 400 also shows a method of clustering text sometimes herein referred to as tabular agglomerative two-dimensional (2-D) clustering.

The method of tabular agglomerative 2-D clustering includes several operations, such as the following (and not necessarily in the following order): (i) extracting an arrangement of text tokens from a document in a corpus of text documents; (ii) generating a text content index, word embedding and relation models of the corpus of text documents; (iii) generate vectors for "text tokens" (that is, fragments of text) in the arrangement using the word embedding; (iv) generating potential composite text objects from the text tokens using proximity, clustering, and the cosine similarity of the fragment vectors; and/or (v) optimizing the spatial alignment using visual features and semantic similarity between adjacent potential composite text objects through the use of a relation model for the purpose of aligning the text fragments.

It is important to note certain definitions of terms used herein, including the following: (i) Keyphrase—nouns and noun phrases from parsing; (ii) Word embedding—skipgram embeddings of the words in the corpus; (iii) Relation model—autoencoder of hypernym and other relations. See prior art; (iv) Knowledge graph—like Wikidata—either extracted from the text content or existing prior across many texts or both; (v) Clustering uses agglomerative—squared Euclidian distance and with a weighting with semantic similarity. The weighting can be learned; and/or (vi) Combining is done by considering the vertical or horizontal alignment of the fragments. The result creates a multi-word text object that can be looked up as a key phrase.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

Dynamically: an action performed without any human intervention and/or on a periodic or intermittent basis depending on the existence and/or completion of certain specified or unspecified conditions.

Comprising/comprise/comprises: As used in the specification (specifically, outside of the claim section), this term is intended to be perfectly synonymous with the term "include" and its various conjugated forms (as defined herein in this specification). The term "comprise" (and its various conjugated forms) as used in the claims is to be given its ordinary interpretation that is consistent with long-standing and standard patent claim interpretation.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

What is claimed is:

1. A computer-implemented method (CIM) comprising:
receive, from a corpus of text documents, a plurality of text fragments, with the plurality of text fragments being text strings that are organized in a staggered manner;
identify, from the plurality of text fragments, a first arrangement of the plurality of text fragments;
responsive to the identification of the first arrangement, extracting a first set of text fragments to obtain an extracted set of text fragments;
generating a relation model based upon the extracted set of text fragments, with the relation model including information indicative of a semantic relatedness value defining the extracted set of text fragments;
clustering the extracted set of text fragments into a first group, based, at least in part, upon the relation model;
combining the clustered set of text fragments from the first group into composite text objects, with the composite text objects including a vector representing a function of the extracted set of text fragments; and
optimizing an alignment of the composite text objects to obtain an organized text fragment.

2. The CIM of claim 1 wherein the semantic relatedness value defining the extracted set of text fragments is determined from a cosine similarity of the extracted set of text fragments.

3. The CIM of claim 1 wherein a vector for the composite text objects is a function of the clustered set of text fragments.

4. The CIM of claim 1 wherein the semantic relatedness value for the composite text objects is determined through the use of a semantic web graph.

5. The CIM of claim 1 wherein the combination of the clustered set of text fragments from the first group into composite text objects includes determining a physical proximity between multiple text fragments within the clustered set of text fragments from the first group.

6. The CIM of claim 1 wherein the combination of the clustered set of text fragments from the first group is done by considering the vertical or horizontal alignment of the text fragments within the clustered set of text fragments from the first group.

7. A computer program product (CPP) comprising:
a machine-readable storage device; and
computer code stored on the machine readable storage device, with the computer code including instructions and data for causing a processor set to perform operations including the following:
receive, from a corpus of text documents, a plurality of text fragments, with the plurality of text fragments being text strings that are organized in a staggered manner,
identify, from the plurality of text fragments, a first arrangement of the plurality of text fragments,
responsive to the identification of the first arrangement, extracting a first set of text fragments to obtain an extracted set of text fragments,
generating a relation model based upon the extracted set of text fragments, with the relation model including information indicative of a semantic relatedness value defining the extracted set of text fragments,
clustering the extracted set of text fragments into a first group, based, at least in part, upon the relation model, combining the clustered set of text fragments from the first group into composite text objects, with the composite text objects including a vector representing a function of the extracted set of text fragments, and optimizing an alignment of the composite text objects to obtain an organized text fragment.

8. The CPP of claim 7 wherein the semantic relatedness value defining the extracted set of text fragments is determined from a cosine similarity of the extracted set of text fragments.

9. The CPP of claim 7 wherein a vector for the composite text objects is a function of the clustered set of text fragments.

10. The CPP of claim 7 wherein the semantic relatedness value for the composite text objects is determined through the use of a semantic web graph.

11. The CPP of claim 7 wherein the combination of the clustered set of text fragments from the first group into composite text objects includes determining a physical proximity between multiple text fragments within the clustered set of text fragments from the first group.

12. The CPP of claim 7 wherein the combination of the clustered set of text fragments from the first group is done by considering the vertical or horizontal alignment of the text fragments within the clustered set of text fragments from the first group.

13. A computer system (CS) comprising:

a processor(s) set;

a machine-readable storage device; and computer code stored on the machine readable storage device, with the computer code including instructions and data for causing the processor set to perform operations including the following:

receive, from a corpus of text documents, a plurality of text fragments, with the plurality of text fragments being text strings that are organized in a staggered manner, identify, from the plurality of text fragments, a first arrangement of the plurality of text fragments, responsive to the identification of the first arrangement, extracting a first set of text fragments to obtain an extracted set of text fragments, generating a relation model based upon the extracted set of text fragments, with the relation model including information indicative of a semantic relatedness value defining the extracted set of text fragments, clustering the extracted set of text fragments into a first group, based, at least in part, upon the relation model, combining the clustered set of text fragments from the first group into composite text objects, with the composite text objects including a vector representing a function of the extracted set of text fragments, and optimizing an alignment of the composite text objects to obtain an organized text fragment.

14. The CS of claim 13 wherein the semantic relatedness value defining the extracted set of text fragments is determined from a cosine similarity of the extracted set of text fragments.

15. The CS of claim 13 wherein a vector for the composite text objects is a function of the clustered set of text fragments.

16. The CS of claim 13 wherein the semantic relatedness value for the composite text objects is determined through the use of a semantic web graph.

17. The CS of claim 13 wherein the combination of the clustered set of text fragments from the first group into composite text objects includes determining a physical proximity between multiple text fragments within the clustered set of text fragments from the first group.

18. The CS of claim 13 wherein the combination of the clustered set of text fragments from the first group is done by considering the vertical or horizontal alignment of the text fragments within the clustered set of text fragments from the first group.

\* \* \* \* \*